No. 852,322. PATENTED APR. 30, 1907.
F. E. FOX.
HAY LOADING MACHINE.
APPLICATION FILED APR. 25, 1906.
9 SHEETS—SHEET 4.

Witnesses
E. G. McKee
F. S. Elmor

Inventor
F. E. Fox
By Victor J. Evans.
Attorney

No. 852,322. PATENTED APR. 30, 1907.
F. E. FOX.
HAY LOADING MACHINE.
APPLICATION FILED APR. 25, 1906.

PATENTED APR. 30, 1907.

F. E. FOX.
HAY LOADING MACHINE.
APPLICATION FILED APR. 25, 1906.

Witnesses
E. G. McKee
F. A. Elmor

Inventor
F. E. Fox
By Victor J. Evans.
Attorney

UNITED STATES PATENT OFFICE.

FREDRICK E. FOX, OF KINSLEY, KANSAS.

HAY-LOADING MACHINE.

No. 852,322.      Specification of Letters Patent.      Patented April 30, 1907.

Application filed April 25, 1906. Serial No. 313,639.

*To all whom it may concern:*

Be it known that I, FREDRICK E. FOX, a citizen of the United States, residing at Kinsley, in the county of Edwards and State of Kansas, have invented new and useful Improvements in Hay-Loading Machines, of which the following is a specification.

This invention relates to harvesters designed especially for harvesting and piling hay or the like, and has for its objects to produce a comparatively simple device of this character wherein the material, when cut, will be fed into a box or receptacle on the vehicle and discharged from the latter from time to time to form piles, one wherein the cutting and conveying mechanisms will be automatically driven during the travel of the machine over the ground, and one in which the material will be positively fed to the sickle during the mowing operation.

A further object of the invention is to provide a device of this character in which the box or receptacle may be readily raised to a desired elevation and thereafter turned for discharging its contents, one wherein the elevator guides may be properly adjusted to permit of the material being discharged at one side and clear of the machine, and one in which the conveyer may be conveniently arranged in an unobstructing position during the operation of elevating and turning the receptacle to discharge its contents.

Further objects of the invention are to provide simple and efficient mechanism for operating the sickle and its conveyers whereby the material will be cut and automatically delivered into the box or receptacle to provide an efficient mechanism for elevating and dumping the receptacle and generally to improve and simplify the construction of the machine as a whole.

With these and other objects in view, the invention comprises the novel features of construction and combination of parts more fully hereinafter described.

In the accompanying drawings.

Referring to the drawings, 1 designates the base frame of the machine comprising longitudinal side bars 2 and a plurality of transverse connecting bars 3 arranged at appropriately spaced intervals, said frame being arranged for travel on front wheels 4 and rear transporting wheels 5 fixed on a rotary shaft or axle 6 journaled in the frame and constituting in conjunction with the latter the running gear of the machine. The wheels 4 are carried by a front truck 7 pivoted as usual upon the king bolt 8, whereby the truck may move in guiding the machine over the ground, there being attached to the truck a tongue or pole 9 to which the draft animals are hitched.

Figures 1, 18, 19:
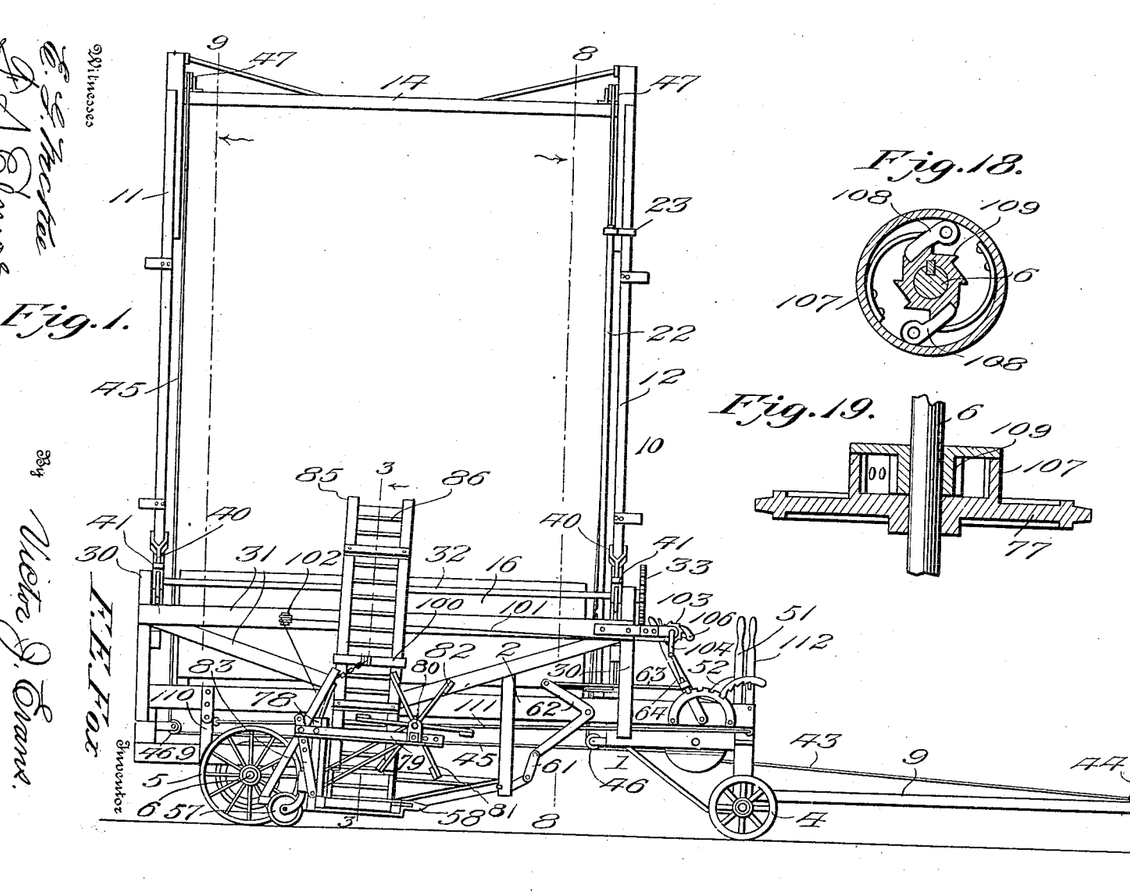
Figure 1 is a side elevation of a machine embodying the invention.
Fig. 18 is a detail section taken on the line 18—18 of Fig. 7, showing the parts on an enlarged scale.
Fig. 19 is a detail section taken on the line 19—19 of Fig. 7, showing the parts on an enlarged scale.
Figures 2, 4:
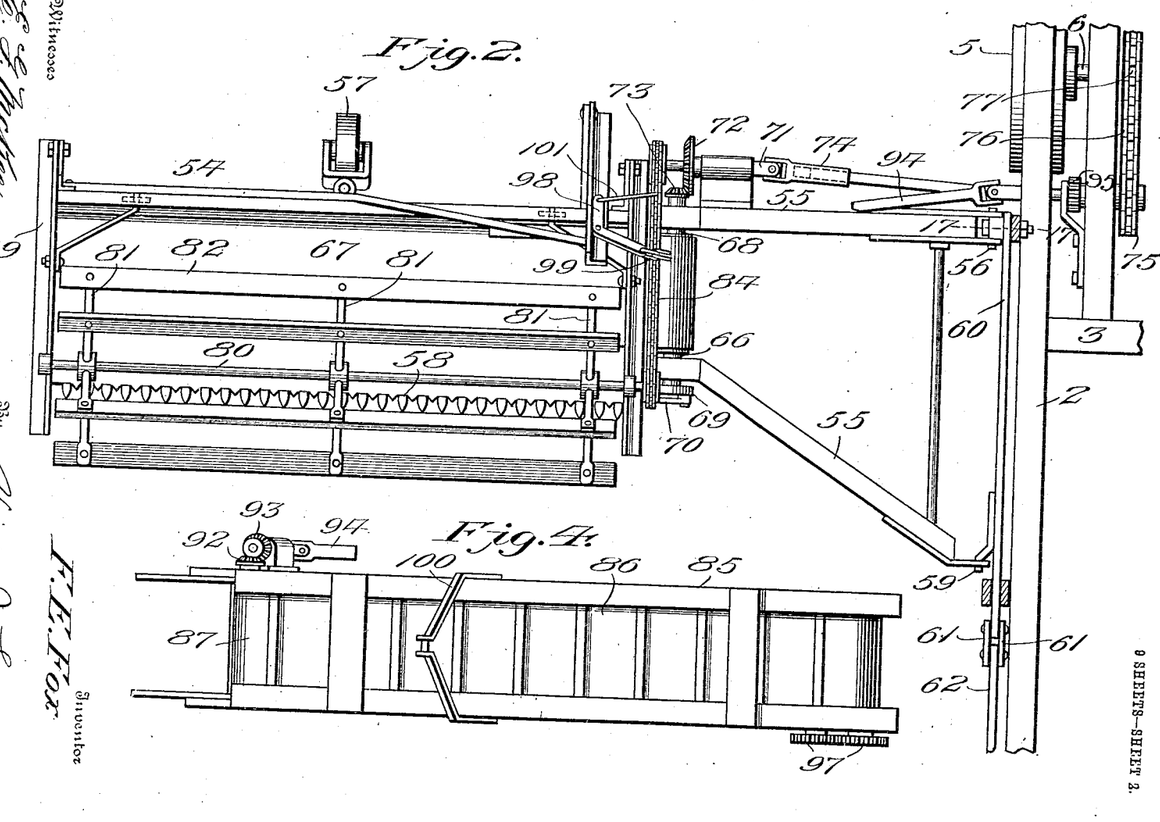
Fig. 2 is a plan view on an enlarged scale of the harvesting mechanism showing the manner of attaching the same to the machine with the vertical conveyer removed.
Fig. 4 is a front elevation of the vertical conveyer.
Figures 3, 12, 13, 14:
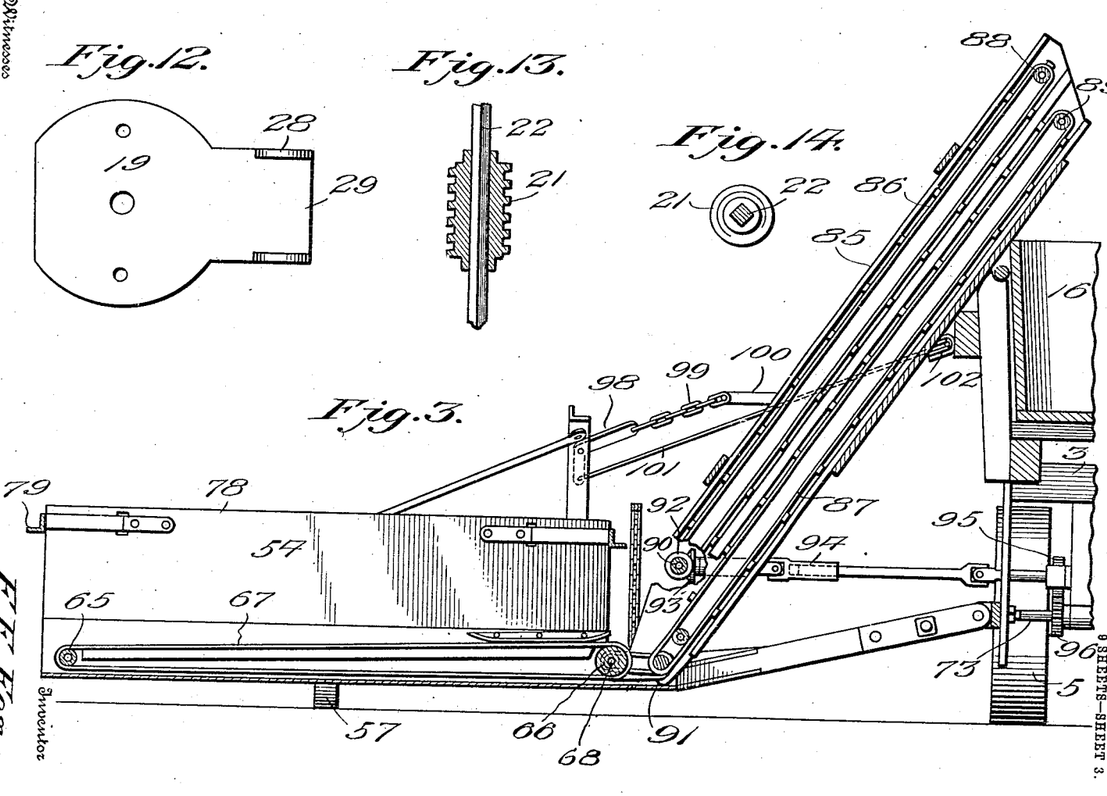
Fig. 3 is a vertical longitudinal section taken on the line 3—3 of Fig. 1, and showing the parts on an enlarged scale.
Fig. 12 is a detail view of the bracket in which the worm shaft is journaled.
Fig. 13 is a detail longitudinal section of the worm.
Fig. 14 is an end view of the worm.
Figures 5, 17:
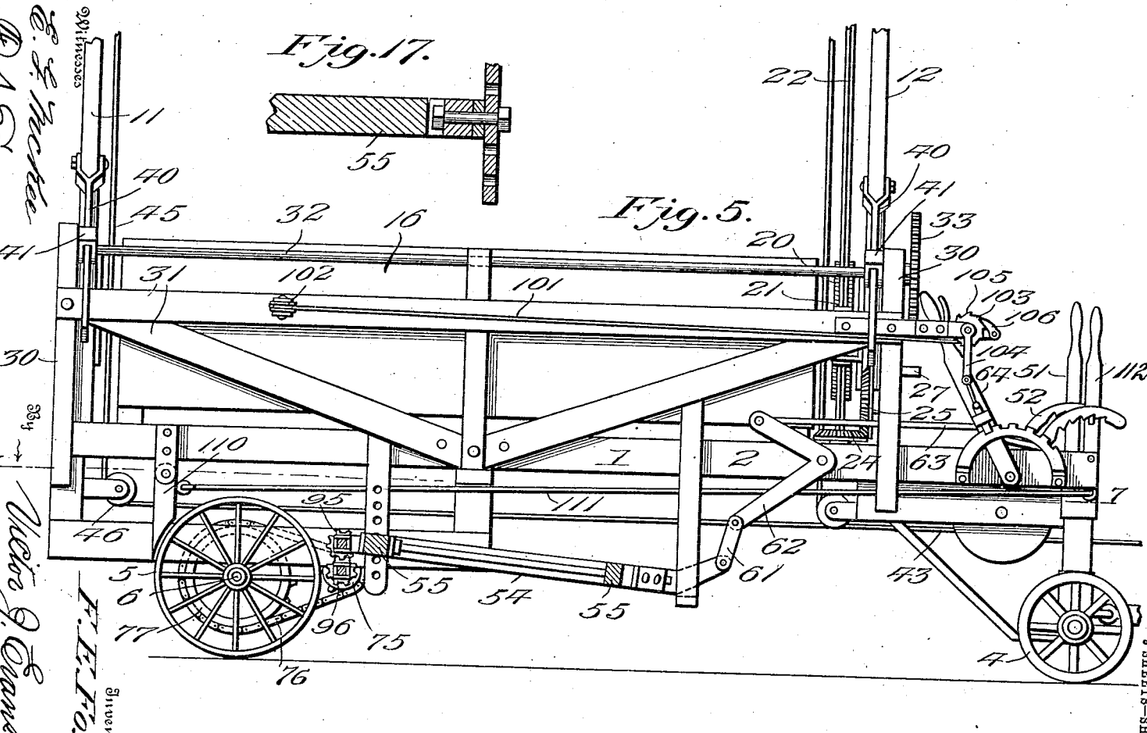
Fig. 5 is a side elevation on an enlarged scale of the machine with the elevated mechanism broken away and the harvesting conveying device removed.
Fig. 17 is a detail section taken on the line 17—17 of Fig. 2, and showing the manner of coupling the harvester frame with the vehicle.
Figures 6, 20:
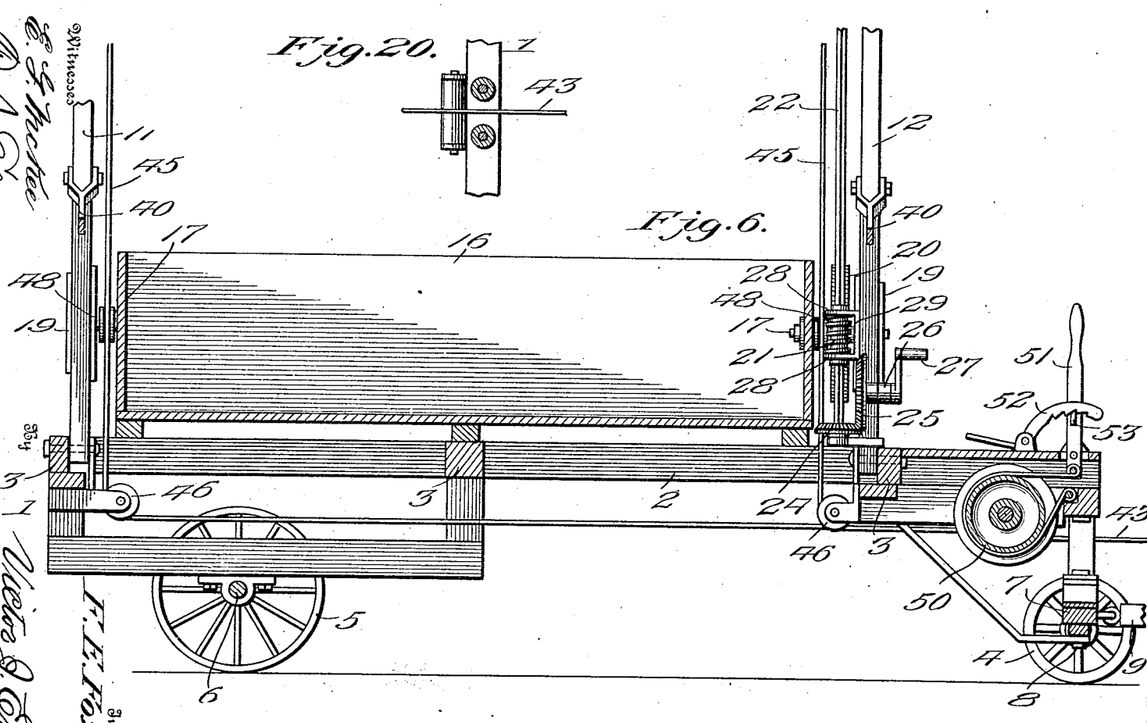
Fig. 6 is a vertical section centrally and longitudinally through the machine, taken on the line 6—6 of Fig. 7.
Fig. 20 is a detail view of the guide for the hoisting rope.
Figure 7:
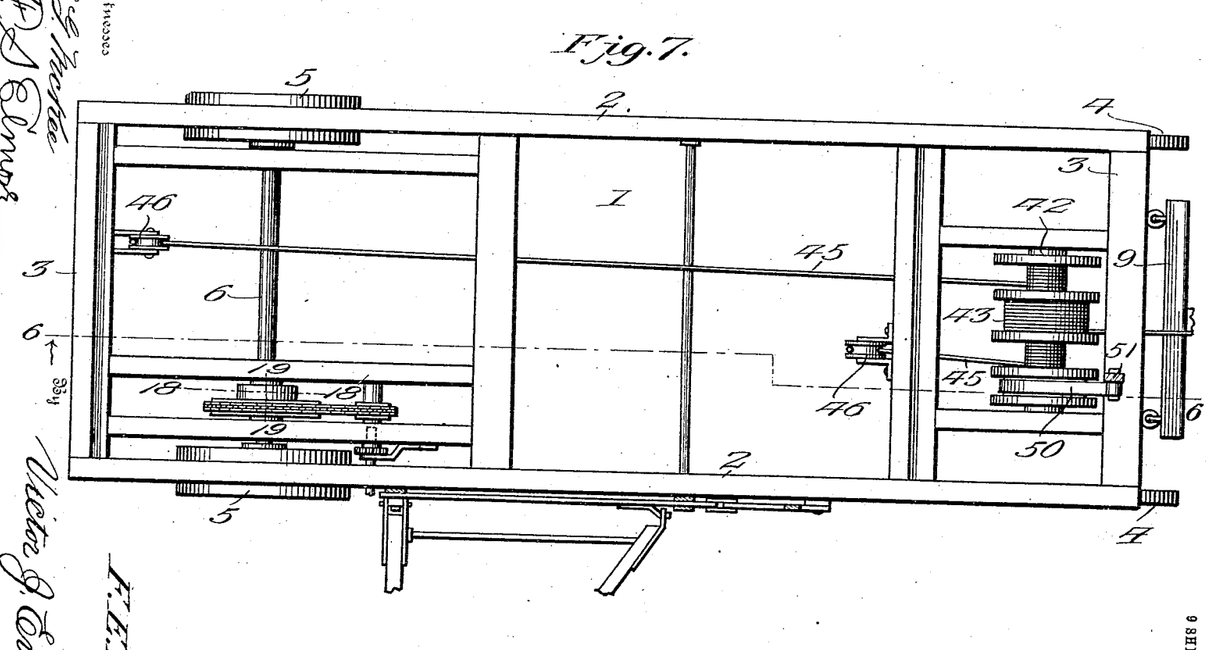
Fig. 7 is a plan view of the running gear, partly in section, the section being taken on the line 7—7 of Fig. 5.
Figures 8, 10, 11:
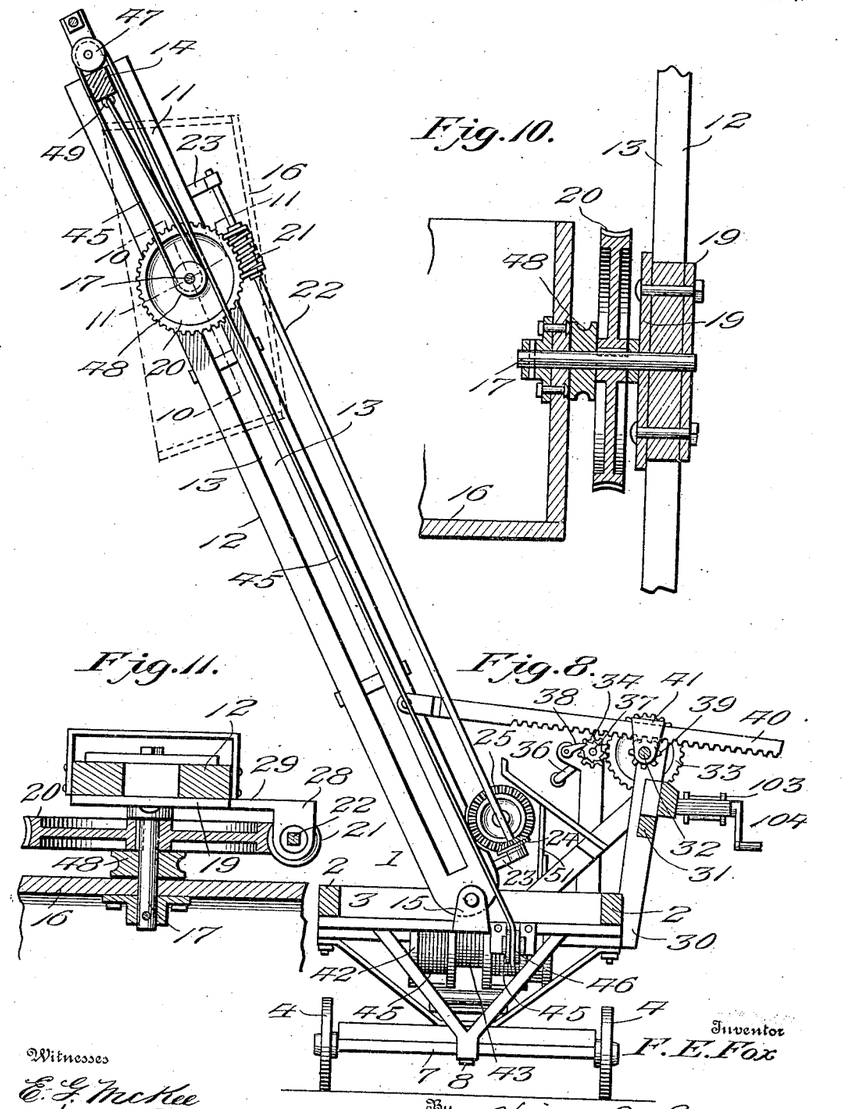
Fig. 8 is a vertical transverse section taken on the line 8—8 of Fig. 1.
Fig. 10 is an enlarged detail section taken on the line 10—10 of Fig. 8.
Fig. 11 is an irregular detail section taken on the line 11—11 of Fig. 8.
Figures 9, 15, 16:
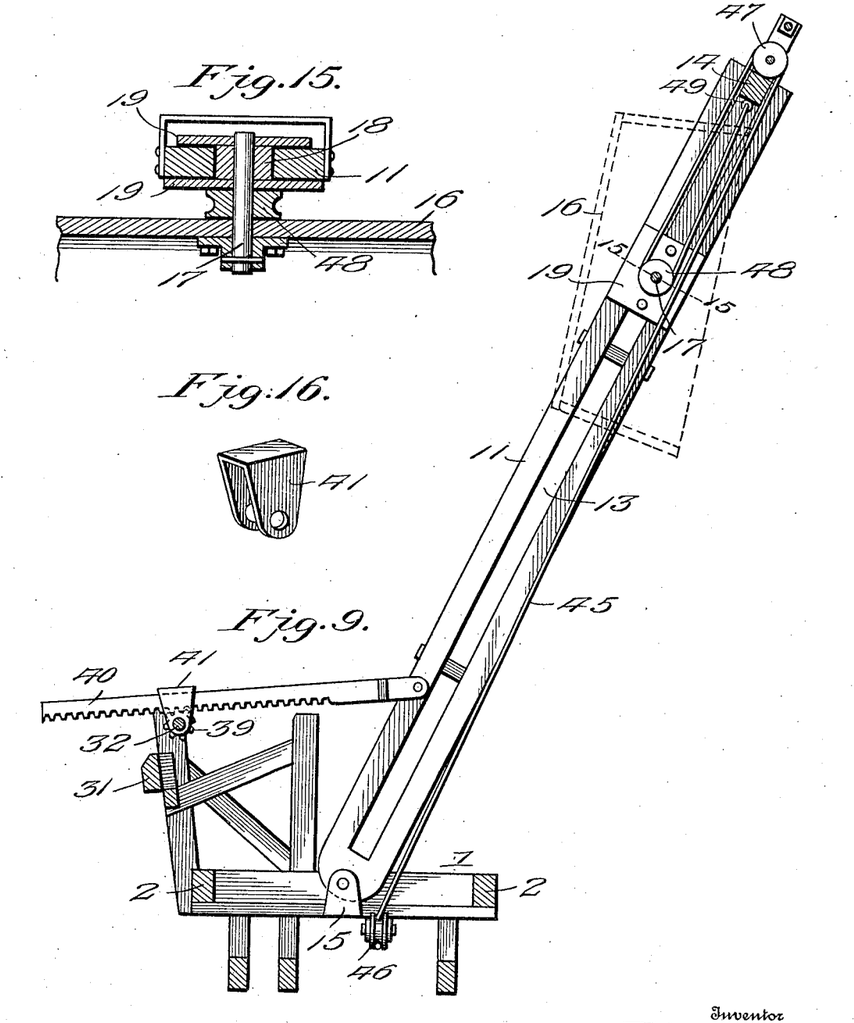
Fig. 9 is a vertical transverse section taken on the line 9—9 of Fig. 1.
Fig. 15 is a detail section on an enlarged scale, taken on the line 15—15 of Fig. 9.
Fig. 16 is a detail perspective view of one of the bearing clips through which the rack bars move.
Figure 21:
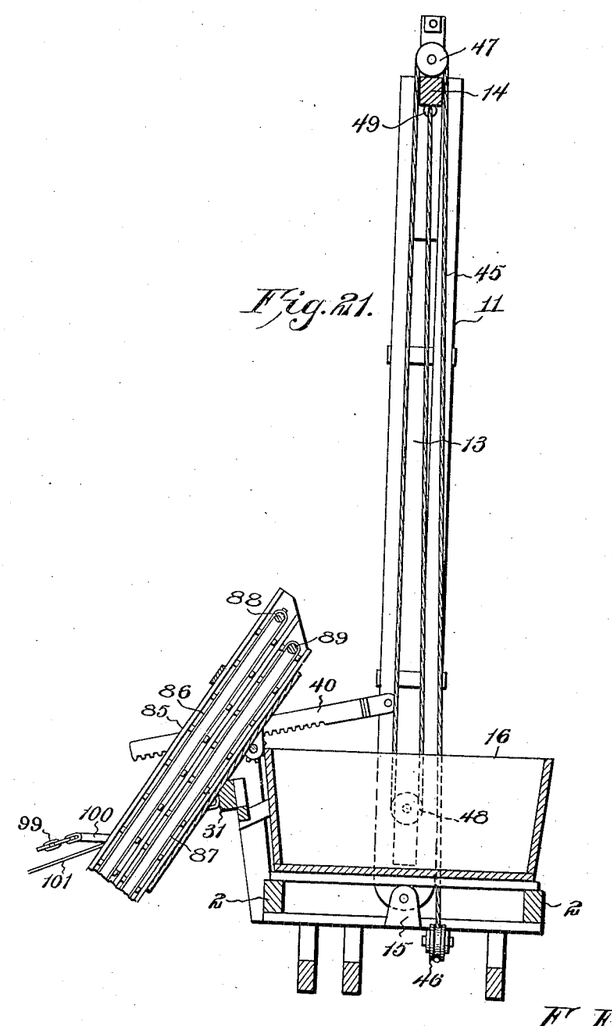
Fig. 21 is a side elevation showing the relative positions of the elevator and conveyer frames.

Sustained upon the frame 1 is an elevator frame 10 including a pair of vertically disposed guide members 11, 12, arranged respectively at opposite ends of the frame and provided with longitudinal slots or guideways 13, said members being connected adjacent their upper ends by a cross-piece 14 and pivoted at their lower ends in bearing members or clips 15 attached to the frame 1, whereby the frame 10 may swing in a vertical plane, while arranged within the frame 10 between the end guides 11, 12, is a box or receptacle 16 having fixed to and projecting longitudinally outward from its end walls stub shafts 17 on which are journaled antifriction guide members or rollers 18 adapted for travel in the guideways 13 and retained in position therein by means of bearing members or plates 19 bolted to the rollers and engaging the side faces of the respective guides 11, 12. Keyed upon one of the stub shafts 17 is a worm gear 20 in mesh with a worm 21 mounted for longitudinal sliding movement upon a worm shaft 22 journaled at its ends in suitable bearings 23 fixed to the adjacent guide 12 and equipped at its lower end with a bevel pinion 24 in mesh with a bevel wheel 25 journaled for rotation in a bearing 26 on the frame and adapted for operation by a crank 27, it being noted in this connection, and as seen more clearly in Figs. 13 and 14, that the shaft 22 is of square or other non-circular form in cross section and extends through a correspondingly shaped opening in the worm 21 which in turn is journaled at its ends in bearing portions or ears 28 formed on the arm or extension 29 of one of the bearing plates 19, whereby the worm is maintained in fixed relation to the gear 20 and for longitudinal movement on the shaft 22, as and for a purpose which will more fully hereinafter appear.

Attached to and rising from the frame 1 is a pair of frame members or standards 30 connected relatively and to the frame by suitable braces 31 and affording bearing for a horizontal shaft 32 on one end of which is fixed a gear 33 in mesh with a pinion 34 having bearing for rotation in a frame member or standard 35 and equipped with an operating crank 36, there being fixed on the shaft of the pinion a toothed ratchet 37 adapted for engagement of a pawl 38 to lock the pinion against reverse movement, while fixed on the shaft 32 at appropriately spaced intervals are pinions 39 in mesh with rack bars 40 attached at their inner ends respectively to the guide members 11, 12 of frame 10 and having bearing between their ends in U-shaped bearing members or clips 41 mounted on the shaft 32 over the pinions 39 for maintaining the racks in engagement with the latter.

Journaled at the forward end of frame 1 is a rotary winding member or drum 42, on which is normally wound a flexible traction element or cable 43 extended outward to the front end of the tongue 9 and provided with a hook 44, there being also connected with and to be wound on the drum 42 a pair of flexible hoisting elements or cables 45 extended respectively around guide rollers 46 suitably journaled at opposite ends of the frame and thence upward along the inner faces of guide members 11, 12 and around guide pulleys 47 journaled at the top of the elevator frame 10, said cables being then extended downward and around guide rollers 48 journaled on the stub shafts 17 and finally secured as at 49 to the cross bar 14 of frame 10. It is to be noted in this connection that when the cable 43 is unwound from the drum the cables 45 will be wound thereon and will, owing to their arrangement around the guide pulleys 46, 47 and 48 hoist the box 16 in the elevator frame 10 for a purpose which will hereinafter appear, and further that as the box is hoisted the worm gear 20, which is fixed on one of the shafts 17, will be carried upward therewith, as will also the worm 21, which is arranged between the bearings 28 and for sliding movement on its shaft 22. Applied at one end of the drum 42 is a band brake 50 of usual form, having one end engaged with and for operation by a lever 51 adapted to be locked against movement by a pivoted toothed rack 52 engaging a fixed pawl 53 on the lever, it being obvious that this brake may be manipulated for locking the drum 42 against movement.

Disposed at one side of the frame 1 and to extend transversely therefrom is a mower frame 54 provided at its inner end with coupling members or beams 55, in turn pivoted at their inner ends at 56 to the frame 1 for permitting vertical movement of the frame 54, the rear side of which is sustained by a caster wheel 57, while disposed at the forward edge of said frame is a sickle bar 58 of the usual or any appropriate construction. The front coupling beam 55 is pivoted at its inner end as at 59 to an adjusting member or lever 60 suitably pivoted at its rear end to the frame 1 and connected at its forward end by means of a link or links 61 with one arm of a bell crank lever 62 pivoted at its elbow to the adjacent side bar 2 and having its other arm in turn connected by a rod 63 with an operating lever 64, it being apparent that by moving the lever 64 the bell crank 62 will be rocked upon its pivot and act through the medium of links 61 for raising or lowering the forward end of lever 60 and adjusting the sickle bar toward and from the ground.

Extending longitudinally of the frame 54 and arranged to travel on rollers 65, 66, is an endless conveyer belt 67 driven through the medium of roller 66 on the shaft 68 on which there is fixed an eccentric head 69 connected by an eccentric rod 70 with and for driving the sickle bar 58, while the roller 66 is driven from a shaft 71 having thereon a bevel gear 72 in mesh with a pinion 73 on the shaft 68, the shaft 71, which includes a universally movable section 74, being provided with a sprocket wheel 75 connected by a chain 76 with a sprocket wheel 77 on the shaft 6, whereby motion is transmitted from the ground wheels to the shaft 71.

The frame 54 is provided with a rear wall 78 constituting an abutment to prevent escape of the material from the conveyer belt, there being pivoted to the ends of said wall supporting levers 79 provided adjacent their forward ends with suitable bearings for the reception of the ends of the central shaft 80 of a rotary feeding member or drum 81, the blades 82 of which serve to act successively upon and sweep the grass or other material into the blades of the sickle bar 58, there being pivoted to the frame 54 links 83 adjustably connected at their upper ends with the rear ends of the levers 79, whereby the latter may be adjusted for moving the blades 82 toward or from the sickle bar. The drum 81 is driven from the shaft 71 by means of a chain belt 84 engaged with suitable pulleys fixed upon the shafts 71 and 80.

Pivoted at its lower end upon the shaft 68 is a vertically inclined conveyer frame 85 having disposed therein a pair of coöperating conveying belts 86, 87, which receive the material from the belt 67 and deliver it into the box or receptacle 16, the belts 86 and 87 being arranged to travel respectively on upper rollers 88, 89, and lower rollers 90, 91, of which latter the lower roller 90 is equipped with a bevel pinion 92 in mesh with a pinion 93 fixed on the end of a drive shaft 94 having at its inner end a gear 95 in mesh with a gear 96 on the shaft 71, whereby motion is transmitted to the conveyer 86, the upper roller 88 of which is connected by gears 97 with the upper roller 89 of belt 87 for driving the latter, it being observed that the arrangement of the gears 97 is such that the rollers 88 and 89 rotate in relatively reverse directions, whereby the material taken by the conveyers 86, 87, will be carried upward therebetween.

Pivoted to a portion of the frame 54 is a bell crank lever 98 having one of its arms connected by a chain 99 with a fixed arm 100 on the frame 85, the other arm of the bell crank lever 98 being engaged with one end of a flexible element or cable 101 arranged for travel on a guide pulley 102 and adapted to be wound upon a drum 103 at the forward end of the machine to vary the inclination of the conveyer frame 85. Fixed upon and for operating the drum 102 is a crank handle 104, there being also carried by the drum a ratchet 105 and adapted for engagement by a pawl 106 to fix the drum against rearward rotation.

The sprocket wheel 77 is formed with a hollow hub 107 containing a pair of spring pressed pawls 108 designed for engagement with a toothed ratchet 109 fixed upon the shaft 6, whereby during forward rotation of the ground wheels 5 the sprocket 77 will be driven for imparting motion to the driving mechanism operated from the latter, it being apparent that during backward rotation of the shaft 6 the ratchet 109 will play idly within the pawls 108, whereby the sprocket 77 and its driven mechanism will remain passive.

Pivoted to the frame 1 for engagement with one of the ground wheels 5 is a brake shoe 110 connected by rod 111 with a brake operating lever 112 for operation as usual to control the speed of the machine.

In practice, as the machine advances over the ground motion is imparted to the sprocket wheel 77 and transmitted therefrom by the chain 76 and sprocket 75 to the shaft 71, which in turn transmits motion to the shaft 94 for driving the conveyer belts 86, 87, as heretofore explained and also to the conveyer 67, sickle bar 58 and drum 81. The material cut by the sickle 58 falls upon the conveyer 67 by which it is carried to the conveyers 86, 87, and thence to and discharged into the box or receptacle 16, which, when filled, is elevated to the top of the guides 11 for discharge. To raise the box in the guides, the draft animals are hooked onto the end of cable 43 and driven forwardly for unwinding the cable from and rotating the drum 42, thereby winding the cables 45 and hoisting the box as heretofore explained. After the box has been properly elevated in the guides 11, the latter are adjusted to the proper inclination through the medium of shaft 32 and the pinion and rack connection 39, 40, after which the hand crank 27 is operated for rotating the shaft 22 through the medium of the gear 25 and pinion 24, thus causing the worm 21 to act upon the gear 20 for turning the box 16 to discharging position, whereby the contents of the box is deposited in a pile upon the ground. After the box has been tilted and its contents discharged the pawl 38 is released from the ratchet 37 to permit reverse movement of shaft 32 for adjusting the guides 11 to a vertical position, after which the crank 27 is operated for lowering the box, the weight of which in descending unwinds the cables 45 from the drum 42 and rewinds the cable 43 onto the latter. At such times as it may be desired to elevate the box 16 to dumping position, the drum 103 is rotated for winding the cable 101 and swinging the conveyer frame 85 upward to a position out of the path of the box.

From the foregoing it is apparent that I produce a simple device admirably adapted for the attainment of the ends in view, it being understood that in attaining these ends minor changes in the details herein set forth may be resorted to without departing from the spirit of the invention.

Having thus fully described the invention, what I claim is:

1. In a device of the class described, an elevator frame having spaced guides, a receptacle mounted for movement longitudinally of the guides and adapted for rotation, a worm gear fixedly connected for rotation with the receptacle, a worm shaft, a worm slidably disposed thereon in engagement with the gear, means for connecting the worm for movement with the receptacle in a direction longitudinally of the guides, means for raising the receptacle in the frame, and means for operating the shaft to rotate the receptacle through the medium of the worm and gear connection.

2. In a device of the class described, an elevator frame including upright guide members having longitudinal guide openings, bearings slidably disposed in said openings, a receptacle having end journals rotatably mounted in said bearings, a worm gear fixed on one of the journals, a worm shaft extended longitudinally of one of the guides, a worm journaled on one of the bearings in engagement with the gear, said worm being slidable on the shaft for movement with the receptacle in its movements on the guides, means for raising and lowering the receptacle bodily in the frame, and means for operating the worm shaft to rotate the receptacle through the medium of the worm and gear connection.

3. In a device of the class described, an elevator frame including upright guides having longitudinal guide openings, a receptacle arranged between the guides and having projecting end journals extended through the guide slots, antifriction rollers rotatively mounted on the journals within the slots, bearing plates applied on the journals to bear at the inner and outer faces of the guides, a worm gear fixed upon one of the journals, a worm shaft extended longitudinally of the adjacent guide, a worm slidably disposed on the shaft in engagement with the gear, said worm being journaled in bearings on one of the bearing plates and sustained for movement with the receptacle in a direction longitudinally of the guides, means for operating the shaft to rotate the receptacle through the medium of the worm and gear connection, and means for raising and lowering the receptacle in the frame.

4. In a device of the class described, an elevator frame including guide bars provided with longitudinal slots, bearings arranged for travel in said slots, a receptacle having projecting end journals rotatably mounted in said bearings, guide pulleys sustained at the upper end of the frame, corresponding pulleys rotatively mounted on said journals, hoisting cables engaged with the frame and extending for travel around the pulleys, said cables being operable for raising and lowering the receptacle in the frame, a worm gear fixed on the receptacle, a worm shaft, a worm slidably disposed thereon in engagement with the gear and sustained for movement with the receptacle, and means for operating the shaft to rotate the receptacle through the medium of the worm and gear connection.

5. In a device of the class described, a main frame, an elevator frame pivotally sustained thereon for vertical swinging movement, and including spaced guide members, an operating shaft journaled on the main frame and carrying pinions, bearing clips disposed on the shaft over said pinions, rack bars connected with the guides and slidable through said bearing clips in engagement with the pinions, said shaft being operable for varying the vertical inclination of the elevator frame, a receptacle rotatably sustained in the latter for movement longitudinally of the guides, means for raising the receptacle, and means for rotating the latter.

In testimony whereof, I affix my signature in presence of two witnesses.

FREDRICK E. FOX.

Witnesses:
C. B. D. COLVER,
HESSA COLVER.